(12) United States Patent
Palmer et al.

(10) Patent No.: US 10,344,847 B2
(45) Date of Patent: Jul. 9, 2019

(54) COOLING ARRANGEMENT FOR COOLING A GEARBOX

(71) Applicant: Dr. Ing. h.c. F. Porsche Aktiengesellschaft, Stuttgart (DE)

(72) Inventors: Eberhard Palmer, Vaihingen/Enz (DE); Andreas Lukas, Heilbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/981,154

(22) Filed: May 16, 2018

(65) Prior Publication Data

US 2018/0335125 A1 Nov. 22, 2018

(30) Foreign Application Priority Data

May 19, 2017 (DE) .................. 10 2017 110 921

(51) Int. Cl.
    *F16H 57/04* (2010.01)
(52) U.S. Cl.
    CPC .................. *F16H 57/0416* (2013.01)
(58) Field of Classification Search
    CPC ............... F16H 57/031; F16H 57/0412; F16H 57/0415; F16H 57/0416; B60K 11/06
    See application file for complete search history.

(56) References Cited

U.S. PATENT DOCUMENTS

| | | | |
|---|---|---|---|
| 4,848,453 A * | 7/1989 | Evans | ................ F16H 57/0415 165/44 |
| 5,671,802 A | 9/1997 | Rogers | |
| 5,927,384 A | 7/1999 | Waldner, Jr. | |
| 6,857,955 B1 * | 2/2005 | Held | ..................... B60H 1/246 454/143 |

(Continued)

FOREIGN PATENT DOCUMENTS

| | | |
|---|---|---|
| DE | 39 11 349 | 10/1990 |
| DE | 103 08 084 | 9/2004 |

(Continued)

OTHER PUBLICATIONS

Machine translation of DE 102009043101 A1 obtained on Sep. 4, 2018.*

(Continued)

*Primary Examiner* — Adam D Rogers
(74) *Attorney, Agent, or Firm* — Gerald E. Hespos; Michael J. Porco; Matthew T. Hespos

(57) ABSTRACT

A cooling arrangement (1) is provided for cooling a gearbox (2) that has a housing (20) on which at least one temperature-critical component is mounted. The cooling arrangement has a gearbox-ventilating device (4) arranged fixedly on the body to adjoin the gearbox (2) and configured to supply the gearbox (2) with cooling air. The gearbox-ventilating device (4) has a first air duct (6) with an air inlet opening (60), via which cooling air can flow into the first air duct (6), and an air outlet opening (62) from which cooling (Continued)

air can flow out of the first air duct (6). A cooling air-channeling means (7) is connected to the first air duct (6) and designed to guide the cooling air flowing out of the air outlet opening (62) and directly onto the temperature-critical component of the gearbox (2).

9 Claims, 3 Drawing Sheets

(56) References Cited

U.S. PATENT DOCUMENTS

| | | | | |
|---|---|---|---|---|
| 8,715,127 | B2* | 5/2014 | Beutler | B60B 35/163 |
| | | | | 475/161 |
| 9,067,486 | B2* | 6/2015 | Janarthanam | H01M 10/625 |
| 9,487,077 | B2* | 11/2016 | Tsuchiya | B60K 1/04 |
| 2004/0231898 | A1 | 11/2004 | Hochkoenig et al. | |
| 2009/0173184 | A1 | 7/2009 | Beutler et al. | |
| 2018/0119793 | A1* | 5/2018 | Doveri | B60K 11/06 |
| 2018/0180163 | A1* | 6/2018 | Schleif | F16H 57/0416 |

FOREIGN PATENT DOCUMENTS

| | | | |
|---|---|---|---|
| DE | 103 14 356 | 10/2004 | |
| DE | 103 50 375 | 6/2005 | |
| DE | 10 2004 044 321 | 3/2006 | |
| DE | 10 2009 023 531 | 12/2010 | |
| DE | 10 2009 043 101 | 3/2011 | |
| DE | 102015106959 A1 * | 11/2016 | B60T 5/00 |

OTHER PUBLICATIONS

Machine translation of DE 10350375 A1 obtained on Sep. 4, 2018.*
German Search Report dated Jan. 11, 2018.

* cited by examiner

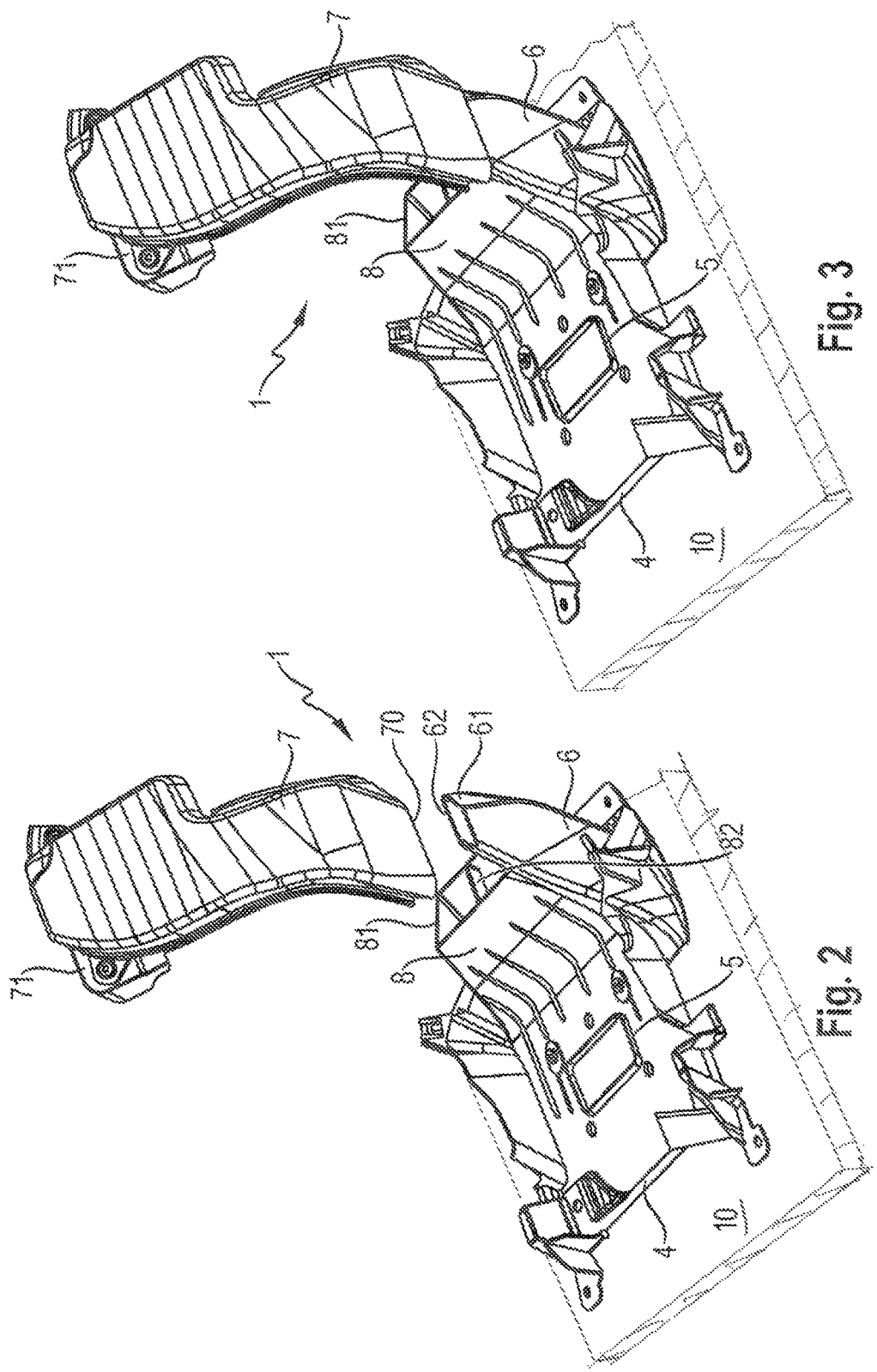

COOLING ARRANGEMENT FOR COOLING A GEARBOX

CROSS REFERENCE TO RELATED APPLICATION

This application claims priority under 35 USC 119 to German Patent Appl. No. 10 2017 110 921.8 filed on May 19, 2017, the entire disclosure of which is incorporated herein by reference.

BACKGROUND

Field of the Invention

The invention relates to a cooling arrangement for cooling a gearbox. The gearbox has a housing on which at least one temperature-critical component is mounted. The cooling arrangement includes a gearbox-ventilating device that is arranged fixedly on the body so as to adjoin the gearbox and that is configured to supply the gearbox with cooling air.

Description of the Related Art

Cooling arrangements for cooling a gearbox are known in the prior art. The cooling air flows through at least one air inlet into the cooling arrangement and can be guided to certain regions of the gearbox, for example by one or more air-channeling ducts and/or by blades or other air deflection means.

DE 103 08 084 B4 discloses a cooling arrangement for cooling a gearbox, in which a cladding part in a front region of a housing of the gearbox has air inlets for cooling purposes. The inlets are wide to produce a slowly flowing air movement.

Gearboxes known frequently have one or more temperature-critical components. These temperature-critical components include, for example, a control device of the gearbox. The control device can be mounted on an outer side of a housing of the gearbox and is exposed to relatively high thermal loading during operation. The control device must be cooled to function properly. Improper cooling could cause the control device to overheats both during driving and with the vehicle stationary.

The object of the invention is to provide a cooling arrangement for cooling a gearbox that makes it possible to provide efficient cooling of a temperature-critical component, in particular a control device, of the gearbox.

SUMMARY

The invention relates to a gearbox ventilating device that has a first air duct and a cooling air-channeling means. The first air duct has an air inlet opening for receiving a flow of cooling air into the first air duct and an air outlet opening from which cooling air can flow out of the first air duct. The cooling air-channeling means is connected to the first air duct and is designed to guide the cooling air flowing from the air outlet opening onto the temperature-critical component of the gearbox. This measure ensures effective direct cooling of the temperature-critical component of the gearbox.

The cooling air-channeling means may extend around the temperature-critical component of the gearbox at least in certain portions and may at least partially enclose the component to allow efficient cooling of the temperature critical component. As a result, the cooling air can be guided directly at least in certain regions onto the temperature-critical component of the gearbox.

The cooling air-channeling means may completely enclose the temperature critical component to ensure a still more effective direct cooling of the temperature-critical component of the gearbox. Completely enclosing the temperature-critical component with the air-channeling means avoids a stationary heating-up. The cooling air-channeling means can be formed in a substantially snorkel-like manner.

The cooling air-channeling means may have a first end and that the first air duct may have a free end in which the air outlet opening is formed. The first end of the cooling air-channeling means and the free end of the first air duct are formed so that, in the desired mounting position, the first air duct extends into the cooling air-channeling means. In other words, the free end of the first air duct engages into the first end of the cooling air-channeling means to achieve a reliable flow connection between the air duct and the cooling air-channeling means.

The gearbox-ventilating device can be mounted fixedly to the body on an underfloor of the motor vehicle to retain the gearbox-ventilating device securely on the body of the motor vehicle. Thus, the cooling air advantageously is supplied to the gearbox-ventilating device from the direction of the underfloor of the motor vehicle.

The cooling air-channeling means may be mounted fixedly on the housing of the gearbox to ensure that the cooling air-channeling means is retained securely.

The cooling air-channeling means may be mounted fixedly to the gearbox, and the gearbox-ventilating device may be mounted fixedly to the body on the underfloor of the motor vehicle to allow relative movements of the cooling air-channeling means relative to the first air duct. The free end of the first air duct may taper in the direction of the air outlet opening. Thus, there remains sufficient play for relative movements of the cooling air-channeling means relative to the free end of the first air duct that engages therein. Moreover, this tapering also produces a nozzle effect that has a positive effect on the flow behavior of the cooling air when flow passes through the first air duct.

The gearbox-ventilating device may have a second air duct with an air inlet opening, through which cooling air can flow into the second air duct, and an air outlet opening, through which the cooling air can flow out of the second air duct.

The second air duct can be adjacent to the first air duct. The cooling air flow of the second air duct can be directed for example onto an underside of the gearbox to cool this region.

The second air duct can taper in the direction of its air outlet opening. This tapering brings about a nozzle effect that has a positive effect on the flow behavior of the cooling air while flow passes through the second air duct.

Further features and advantages of the invention will become clearer from the following description of an embodiment with reference to the appended drawings.

BRIEF DESCRIPTION OF THE DRAWINGS

FIG. 2 shows an exploded view of a cooling arrangement for cooling the gearbox according to FIG. 1.

FIG. 3 is a perspective view of the cooling arrangement according to FIG. 2.

DETAILED DESCRIPTION

Figure 1:
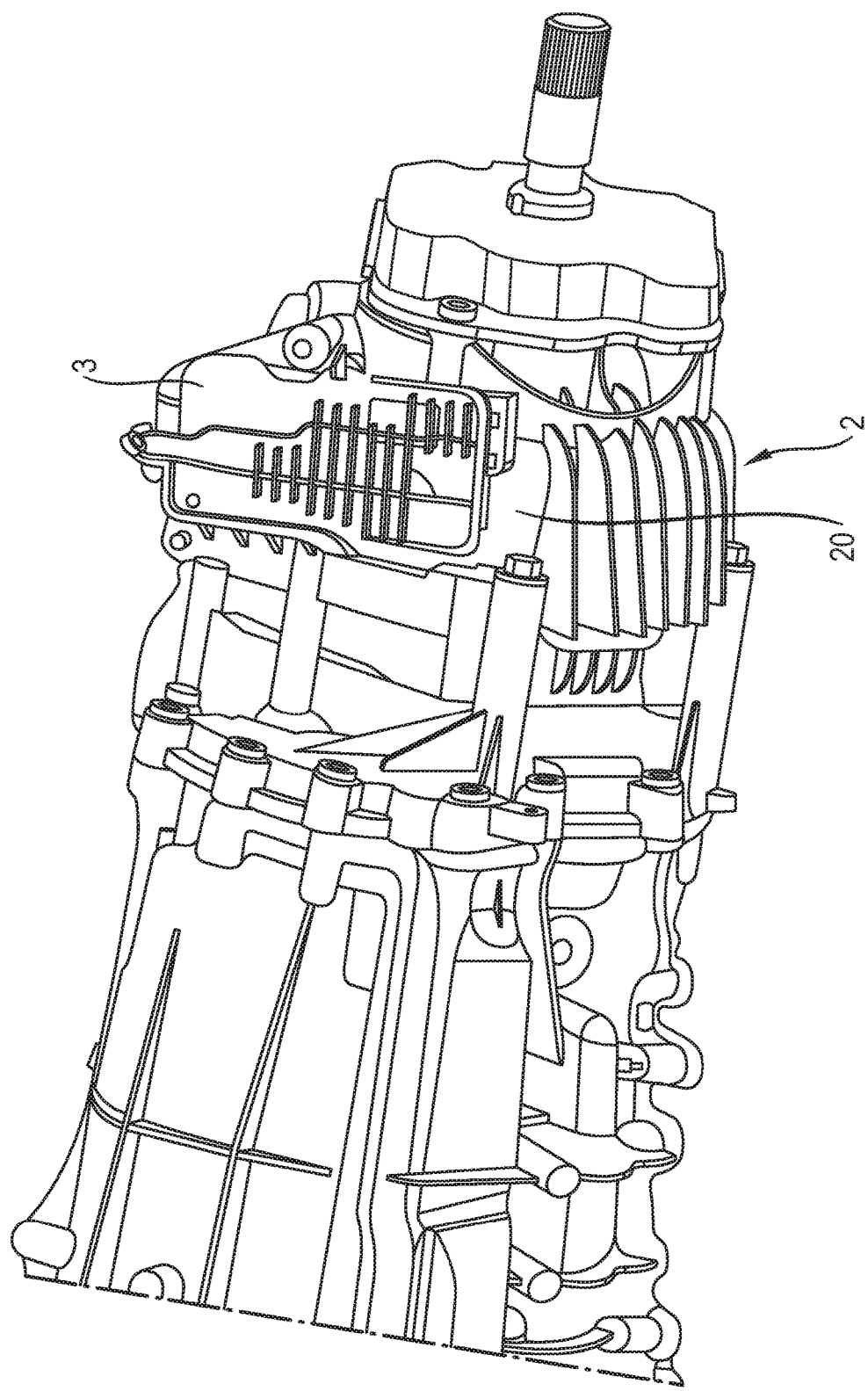
FIG. 1 is a perspective view of a part of a gearbox of a motor vehicle with a control device mounted on a housing of the gearbox.
Figure 4:
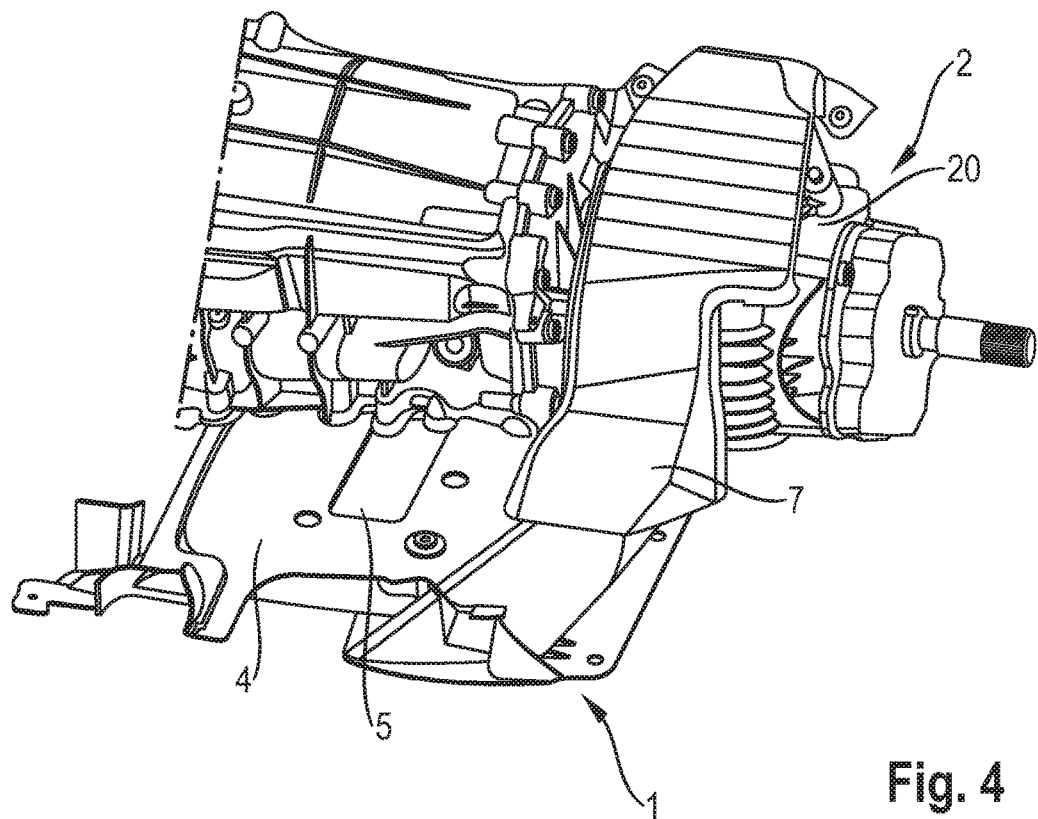
FIG. 4 is a perspective illustration of the part of the gearbox of FIG. 1 with the cooling arrangement of FIGS. 2 and 3.

FIG. 1 shows a part of a gearbox 2 that is referred to as a "hang-on gearbox" and that is used in motor vehicles with a clutch-controlled all-wheel drive in which one of the axles of the motor vehicle is driven permanently and the other axle is driven only as required. The gearbox 2 has a housing 20, and a control device 3 that controls the operation of the gearbox 2 is mounted on the housing 20. The control device 3 is a temperature-critical component of the gearbox 2 and must be cooled to avoid overheating during driving of the motor vehicle and when the vehicle stationary. Ineffective cooling can lead to a disruption of the operation or irreversible damage to the control device 3.

FIGS. 2 and 3 illustrate a cooling arrangement 1 to allow effective cooling of the control device 3. The cooling arrangement 1 has a gearbox-ventilating device 4 that can be mounted fixedly to the body on an underfloor 10 of the motor vehicle. The gearbox-ventilating device 4 comprises an air inlet 5 that can supply cooling air from the direction of the underfloor 10 of the motor vehicle for cooling the gearbox 2.

Figure 5:
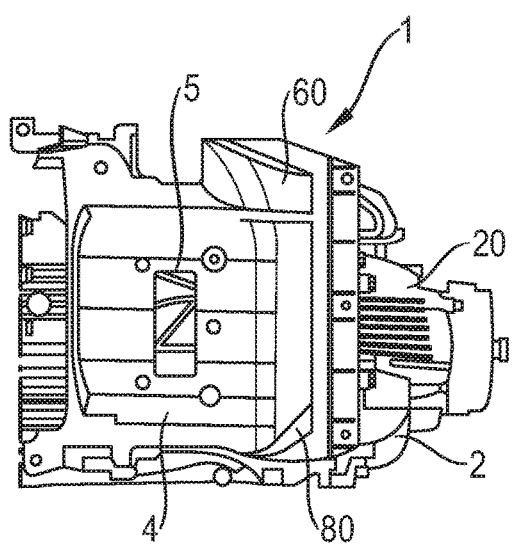
FIG. 5 is a bottom view of the part of the gearbox of FIG. 1 with the cooling arrangement of FIGS. 2 and 3.

The gearbox-ventilating device 4 further comprises a first air duct 6 with an air inlet opening 60 that can be seen in the bottom view of FIG. 5. Cooling air can flow from the direction of the underfloor of the motor vehicle into the first air duct 6 via this air inlet opening 60. The first air duct 6 further has a free end 61 with an air outlet opening 62, from which cooling air can flow out of the first air duct 6.

The cooling arrangement 1 further has a cooling air-channeling means 7 for cooling the control device 3 mounted on the housing 20 of the gearbox 2. In the present case, the cooling air-channeling means 7 is designed to be substantially snorkel-like. The cooling air-channeling means 7 has a first end 70 that is to be placed on the first air duct 6 so that the first air duct 60 extends into the cooling air-channeling means 7 and engages therein. This ensures a secure flow connection so that the cooling air can flow out of the air outlet opening 62 of the first air duct 6 into the cooling air-channeling means 7.

The cooling air-channeling means 7 extends around the control device 3 mounted on the housing 20 of the gearbox 2 and completely encloses the control device 3. The control device 3 can be cooled directly and thus is protected from overheating by the cooling air that flows through the cooling air-channeling means 7 and flows out toward the control device 3. The air-channeling means 7 is designed and arranged to completely enclose the control device 3, thereby ensuring in a particularly advantageous manner that the gearbox 2 can be cooled effectively during the driving operation of the motor vehicle and also with the vehicle stationary. As a result, a stationary overheating of the control device 3 can be prevented.

The cooling air-channeling means 7 further has a second end 71 that is mounted fixedly on the housing 20 of the gearbox 2. This fixed mounting to the gearbox means that the cooling air-channeling means 7 has three degrees of freedom for relative movements with respect to the gearbox-ventilating device 4 fixed to the body in three mutually orthogonal spatial directions (i.e. in the longitudinal direction, in the transverse direction and in the vertical direction) if the gearbox 2 moves in the corresponding directions. To allow these relative movements of the cooling air-channeling means 7 fixed to the gearbox relative to the gearbox-ventilating device 4 fixed to the body, the free end 61 of the first air duct 6 tapers in the direction of the air outlet opening 62. Thus, there remains sufficient play for relative movements of the cooling air-channeling means 7 relative to the free end 61 of the first air duct 6 that engages therein. Moreover, this tapering makes available a nozzle effect that has an advantageous effect on the flow behavior of the cooling air when flow passes through the first air duct 6.

To further improve the cooling of the gearbox 2, the gearbox-ventilating device 4 has a second air duct 8 that comprises an air inlet opening 80, through which cooling air can flow into the second air duct 8 from the direction of the underfloor of the motor vehicle, and an air outlet opening 81, through which the cooling air can flow out of the second air duct 8. The gearbox 2 can be cooled on an underside directed toward the underfloor of the motor vehicle by the cooling air that flows through the second air duct 8. In this embodiment, the second air duct 8 tapers in the direction of its air outlet opening 81 to produce a nozzle effect with a positive effect on the flow behavior of the cooling air when flow passes through the second air duct 8. In the present case, a separating web 82 subdivides the air outlet opening 81 into two regions. The air inlet 5 that communicates with the housing of the gearbox constitutes a third air inlet opening.

The cooling arrangement 1 provides effective cooling of at least one temperature-critical component of the gearbox 2, which in the present case is a control device 3. The control device 3 is surrounded completely by the cooling air-channeling means 7 that can be supplied with cooling air from the direction of the underfloor of the motor vehicle by means of the specially formed first air duct 6.

What is claimed is:

1. A cooling arrangement for cooling a gearbox of a motor vehicle that has a body with an underfloor, the gear box having a housing on which at least one control device is mounted, the cooling arrangement comprising: a gearbox-ventilating device arranged fixedly on the underfloor to adjoin the housing of the gearbox and configured to supply the gearbox with cooling air, the gearbox-ventilating device having a first air duct with a first air inlet opening, via which cooling air can flow into the first air duct, and with a first air outlet opening, from which cooling air can flow out of the first air duct, a second air inlet opening aligned for directing a flow of cooling air from a direction of the underfloor toward an area of the gearbox facing toward the underfloor and spaced from the control device and a cooling air-channeling means having a first end communicating with the first air outlet opening of the first air duct and a second end mounted fixedly on the housing of the gearbox and at least partially enclosing the control device to directly guide the cooling air flowing out of the first air outlet opening onto the control device of the gearbox.

2. The cooling arrangement of claim 1, wherein the cooling air-channeling means completely encloses the control device.

3. The cooling arrangement of claim 1, wherein the first air duct has a tapered free end in which the first air outlet opening is formed, the first end of the cooling air-channeling means and the free end of the first air duct are formed so that the first air duct extends into the cooling air-channeling means and is movable relative to the first end of the cooling air-channeling means to accommodate relative movements between the underfloor and the gearbox.

4. The cooling arrangement of claim 1, wherein a free end of the first air duct tapers toward the first air outlet opening.

5. The cooling arrangement of claim 1, wherein the gearbox-ventilating device further has a second air duct communicating with the second air inlet opening, through which cooling air can flow into the second air duct, and the second air duct having a second air outlet opening, through which the cooling air can flow out of the second air duct and to an area of the gearbox spaced from the control device.

6. The cooling arrangement of claim 5, wherein the second air duct is adjacent to the first air duct.

7. The cooling arrangement of claim 5, wherein the second air duct tapers toward the second air outlet opening.

8. The cooling arrangement of claim 5, further comprising a third air inlet opening formed in the gearbox-ventilating device and communicating with a surface of the housing of the gearbox facing toward the underfloor.

9. The cooling arrangement of claim 1, wherein the control device is disposed on a part of the gearbox facing away from the underfloor, and an end of the cooling air-channeling means spaced from the first air duct is curved to extend at least partly around the gearbox and into a position for at least partially enclosing the control device.

* * * * *